US005202666A

United States Patent [19]

Knippscheer

[11] Patent Number: 5,202,666

[45] Date of Patent: Apr. 13, 1993

[54] METHOD AND APPARATUS FOR ENHANCING HYGIENE

[75] Inventor: Hermann Knippscheer, Baldwin, N.Y.

[73] Assignee: Net/Tech International Inc., Baldwin, N.Y.

[21] Appl. No.: 643,545

[22] Filed: Jan. 18, 1991

[51] Int. Cl.[5] ........................ G08B 23/00; G08B 13/18; H04B 1/40

[52] U.S. Cl. .................................... 340/573; 340/541; 340/567; 455/88; 367/93

[58] Field of Search ............... 340/573, 556, 567, 572, 340/603, 505, 541, 540, 384 E, 407; 4/623; 455/100, 88-90; 367/93

[56] References Cited

U.S. PATENT DOCUMENTS 3,967,478 7/1976 Guinn ............................ 340/573 X
4,767,922 8/1988 Stauffer .......................... 340/556 X
4,896,144 1/1990 Bogstad .............................. 340/691

*Primary Examiner*—Jin F. Ng
*Assistant Examiner*—Thomas J. Mullen, Jr.
*Attorney, Agent, or Firm*—R. Neil Sudol; Henry D. Coleman

[57] ABSTRACT

An apparatus for enhancing hygiene comprises a sensor for generating a first signal upon automatically sensing that an individual has entered a washroom and for generating a second signal upon automatically sensing that the individual has exited the washroom. The hygiene enhancing apparatus further comprises a monitoring device for automatically monitoring an individual upon his entry into the washroom, to automatically determine whether the individual has cleaned his hands. The monitoring device includes a generator for producing a third signal upon a detection by the monitoring device that the individual has cleaned his hands. An alert signal generator is provided for generating an alert signal cognizable by a human being. The alert signal generator is operated or activated by a control unit which is operatively connected to the sensor, the monitoring device, and the alert signal generator. The control unit activates the alert signal generator to issue the alert signal upon reception of the first signal and the second signal by the control unit and failure of the control unit to receive the third signal prior to receiving the second signal.

26 Claims, 3 Drawing Sheets

METHOD AND APPARATUS FOR ENHANCING HYGIENE

BACKGROUND OF THE INVENTION

This invention relates to a method and related apparatus for enhancing hygiene. More particularly, this invention relates to such a method and apparatus which is effective to promote hygiene in restaurants and hospitals and other businesses and institutions where cleanliness is particularly crucial.

The dangers of unclean practices in restaurants and hospitals has been well known for a century. Bacteria and other microbial organisms which are the causes of many contagious diseases are capable of being transmitted from an infected individual to many other people if sanitary conditions are not maintained in such settings where the micro-organisms thrive and where people are susceptible to receiving into their bodies such micro-organisms. Although governmental bodies have promulgated many regulations governing hygienic practices in restaurants, hospitals and other institutions, monitoring adherence to the regulations is still accomplished by intermittent checks by supervisory personnel and public employees.

OBJECTS OF THE INVENTION

An object of the present invention is to provide a method and apparatus for enhancing hygiene.

Another object of the present invention is to provide such a method and apparatus for increasing adherence to hygienic practices in restaurants and hospitals and other such businesses and institutions.

Another, more particular, object of the present invention is to provide such an apparatus which is easily installable into existing sanitary facilities.

A further particular object of the present invention is to provide such a method which is easily adapted to existing conventions in restaurants, hospitals and other businesses and institutions.

SUMMARY OF THE INVENTION

An apparatus for enhancing hygiene comprises, in accordance with an embodiment of the present invention, a first monitoring device for automatically monitoring an individual upon entry of the individual into a washroom, to automatically determine whether the individual has cleaned his hands. A second monitoring device is provided for automatically detecting that the individual has exited the washroom, while an alert signal generator is operatively connected to the first monitoring device and the second monitoring device for automatically generating an alert signal cognizable by a human being, upon detecting that the individual has exited the washroom and has not washed his hands while in the washroom.

An apparatus for enhancing hygiene comprises, in accordance with a more particular embodiment of the present invention, a sensor for generating a first signal upon automatically sensing that an individual has entered a washroom and for generating a second signal upon automatically sensing that the individual has exited the washroom. The hygiene enhancing apparatus further comprises a monitoring device for automatically monitoring an individual upon his entry into the washroom, to automatically determine whether the individual has cleaned his hands. The monitoring device includes a generator for producing a third signal upon a detection by the monitoring device that the individual has cleaned his hands. An alert signal generator is provided for generating an alert signal cognizable by a human being. The alert signal generator is operated or activated by a control unit which is operatively connected to the sensor, the monitoring device, and the alert signal generator. The control unit activates the alert signal generator to issue the alert signal upon reception of the first signal and the second signal by the control unit and failure of the control unit to receive the third signal prior to receiving the second signal.

The hygiene enhancing device pursuant to this particular embodiment of the present invention may further comprise a transmitter carried on the person of the individual for emitting a wireless signal identifying the individual, the sensor including a detector responsive to the wireless signal. In addition, a receiver may be carried on the person of the individual and operatively connected to the transmitter for activating the transmitter upon receiving a wireless activation signal.

Pursuant to another feature of the present invention, the sensor further includes a generator for emitting the activation signal. Preferably, the activation signal generator operates continuously at a low power level, thereby limiting the effective range of the generator. Alternatively, the sensor also includes an additional detector for detecting any person entering the washroom, the additional detector being operatively coupled to the generator for enabling that device to emit the activation signal upon a detection of a person by the additional detector. The additional detector may take the form of an infrared radiation detector or an ultrasonic pressure wave detector.

Pursuant to a further feature of the present invention, the transmitter is disposed on a name tag. In this way, every employee of a restaurant or hospital or other service organization, who is required to wear such identification elements, can be automatically monitored to ensure that such individuals abide by the sanitation regulations promulgated by the institution or by governmental bodies.

Pursuant to another feature of the present invention, the monitoring device includes a component for detecting deposition of a cleaning agent on hands of the individual. Alternatively, or additionally, the employee monitoring device may include a component for determining whether the individual has run water onto his hands and/or has dried his hands with a blower or other drying device.

The alert signal generated upon detecting a failure of an individual to clean his hands may be an audible alert signal. For example, a prerecorded voice message may be produced to remind the employee of the regulation and to suggest or command the employee to return to the washroom to clean his hands. If the individual returns to the washroom, the hygiene enhancing apparatus checks again to determine whether the individual cleans his hands.

In the event that a monitored individual who has not cleaned his hands fails to return to the washroom within a predetermined time period, a second alert signal may be generated. The second alert signal may take a different form, for example, a light flashing on the employee name tag, or a signal on a computer monitor screen at a central management location. The failure of the employee to clean his hands may also be recorded in a computer's memory bank, for inducing or supporting later discipline by a supervisor.

A method for enhancing hygiene comprises, in accordance with the present invention, the steps of (a) monitoring an individual upon his entry into a washroom, to determine whether the individual has cleaned his hands, (b) detecting that the individual has exited the washroom, and (c) generating an alert signal cognizable by a human being, upon detecting that the individual has exited the washroom and has not washed his hands while in the washroom.

Pursuant to further features of the present invention, the following additional steps are executed: (d) sensing that the individual has entered the washroom, (e) generating a first signal upon detecting that the individual has entered the washroom, (f) generating a second signal upon detecting that the individual has cleaned his hands, and (g) generating a third signal upon detecting that the individual has exited the washroom. The alert signal is produced upon generation of the first signal and the third signal in an absence of generation of the second signal.

In another step in accordance with the present invention, a transmitter is operated to emit a wireless signal identifying the individual. Preferably, the transmitter is carried on the person of the individual, for example, on a name tag. The individual is then detected by sensing the wireless signal from the transmitter. In accordance with this feature of the invention, each individual employee is assigned a particular signal code, for example, a respective electromagnetic or ultrasonic frequency. The sensor, placed at the entrance of a bathroom or other facility wherein a person can become contaminated, is able to detect the different pre-established frequencies and thereby identify any tagged individual who enters the washroom or other facility.

Preferably, the employee identification signal is emitted by the transmitter in response to a wireless activation signal. The activation signal is constantly emitted by a transmitter at the door of the washroom. Alternatively, the hygiene enhancing apparatus includes a secondary detector, for example, an infrared scanner or an ultasonic movement detector, and the activation signal is emitted only upon detection of a person by the secondary detector.

A method and apparatus in accordance with the present invention operates to enhance hygiene at restaurants, hospitals and other institutions wherein cleanliness is especially vital. The system is easy to implement insofar as employees at those institutions or businesses generally universally wear name tags which can be provided with individualized transmitters. The energy supply units on the name tags may be recharged between successive work shifts by having the workers place their tags in a recharging device. In addition, the name tags can serve to track and record employee arrival and departure times.

DETAILED DESCRIPTION

Figure 1A:
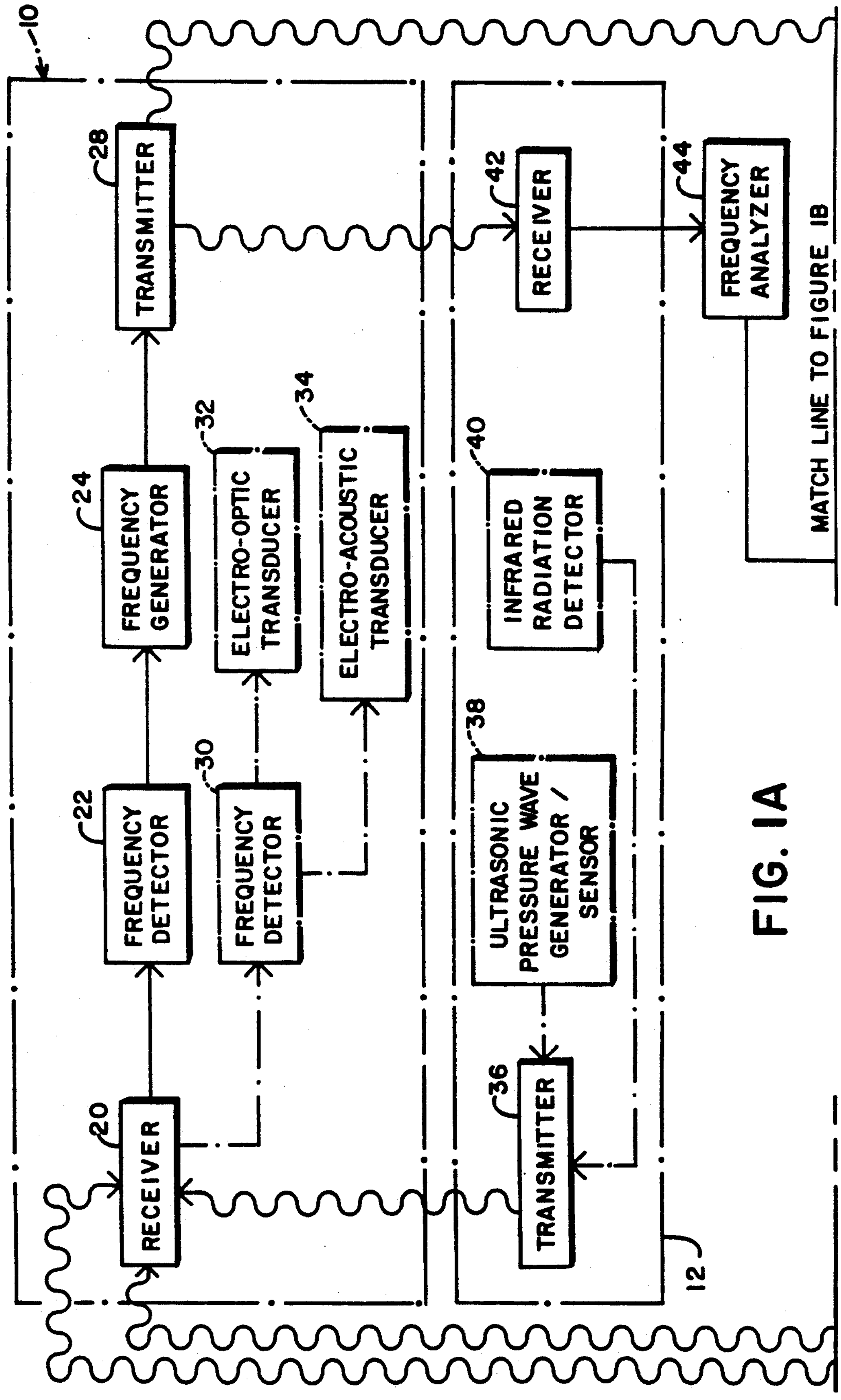
FIG. 1 is a block diagram of a system or apparatus in accordance with the present invention, for enhancing personal hygiene, particularly in institutional or business settings.
Figure 1B:
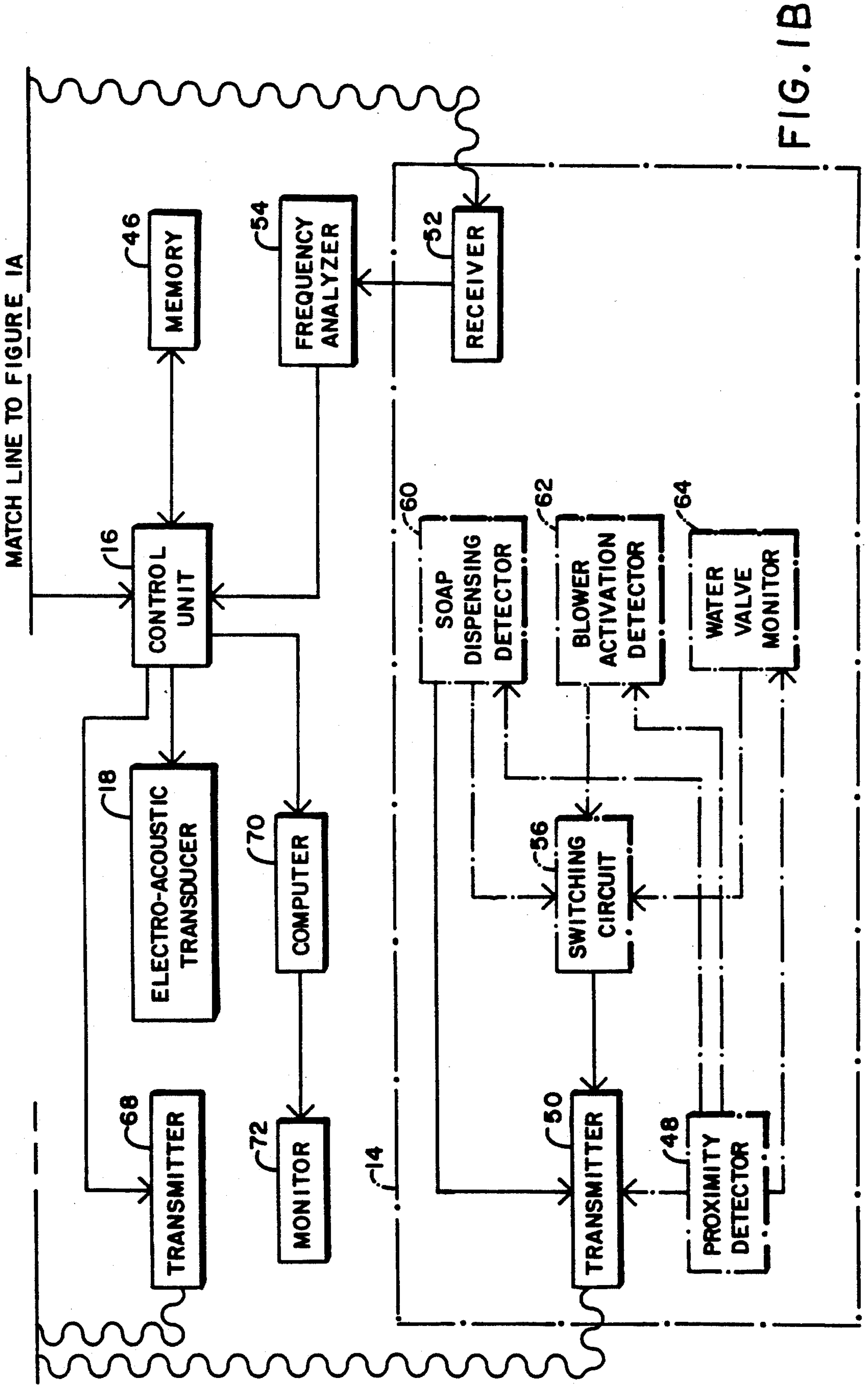

As illustrated in FIG. 1, a system or apparatus for enhancing personal hygiene, particularly in institutional or business settings, comprises a first subassembly 10 which is carried by an employee, for example, on a name tag or other supporting component. The system further comprises a second subassembly 12 disposed at least in part at the entrance to a washroom or other facility wherein a person can become contaminated, for example, by micro-organisms. A third subassembly 14 is located at least in part inside the washroom facility. The hygiene enhancing system also comprises a control unit 16 and other components to be described in detail hereinafter.

The first and second subassemblies 10 and 12 cooperate with one another to detect the entry of a preselected individual (e.g., an employee of a restaurant or hospital or other business of institution) into the washroom facility. It is to be understood that the washroom facility is any facility wherein it is desirable that a person clean or sterilize his hands prior to leaving the facility.

The third subassembly 14 serves to monitor employees who have entered the washroom to determine whether they have cleaned their hands while in the washroom. The subassemblies 10, 12, and 14 provide information to control unit 16 for enabling that unit to provide an alert or warning signal in the event that a pre-identified individual (e.g., an employee) leaves the washroom without having cleaned his hands while in the washroom.

Control unit 16 is connected at an output to an electro-acoustic transducer (e.g., a speaker) 18 for issuing an audible message to a person who is leaving the washroom. In the event that an employee leaving the washroom has cleaned his hands, control unit 16 generates an electrical signal which is converted by transducer 18 into a message such as "Thank you for your cooperation in preserving sanitary conditions," or simply "Thank you for washing your hands." In contrast, in the event that an employee of a restaurant or hospital leaves the washroom without having cleaned his hands, control unit 16 activates transducer 18 to produce a warning or request that the employee return to the washroom to clean his hands.

It is clear that other kinds of transducers may be included in the hygiene enhancing system to produce a signal either reminding an employee of his neglect or alerting supervisory personnel or other people of the possibly unsanitary condition of the employee's hands. The transducer may take any form capable of providing information such as an electro-optic device.

Subassembly 10 includes a receiver 20 for receiving incoming wireless signals, preferably electromagnetic waveforms. Receiver 20 is connected at an output to a first frequency detector 22 in turn coupled to a generator 24 of a predetermined frequency assigned to the particular employee. Thus each employee is identifiable by a respective frequency. Frequency generator 24 is tied to a transmitter 28 which emits wirelessly the frequency produced by generator 24. Subassembly 10 may optionally include a second frequency detector 30 which is connected at an output to an electro-optic transducer 32 (e.g., a light emitting diode) and alternatively or additionally to an electro-acoustic transducer 34 (a speaker).

As discussed above, the components of subassembly 10 are disposed on a name tag or other carrier which may, for example, be fastened to the clothing of the employee. A name tag is considered to be particularly suitable insofar as all employees of restaurants and hospitals, as well as other institutions requiring a certain modicum of cleanliness, are required to wear name tags or other identification badges.

Subassembly 10 also includes a non-illustrated power source in the form of a battery. The battery may be charged between work shifts of the employee by leaving the name tag or carrier at a charging station. Such a charging station may also serve to identify or determine the arrival and departure times of the respective employees.

Receiver 20 of subassembly 10 receives a first preestablished frequency from a transmitter 36 in subassembly 12. Preferably, transmitter 36 transmits constantly at a low power level. The low power level serves to limit the effective range of transmitter 36 to a pre-established region around the entrance to the washroom facility.

Alternatively, transmitter 36 is dormant unless energized or activated by an ultrasonic movement detector 38 which includes a generator (not illustrated) for producing ultrasonic pressure waves and a sensor (not illustrated) for detecting the ultrasonic pressure waves upon return of the waves from an object in the vicinity.

As an alternative to ultrasonic movement detector 38, an infrared radiation detector 40 may be provided to activate transmitter 36. In either of these alternative embodiments, transmitter 36 is dormant until a person enters the washroom facility. At that time, transmitter 36 emits the pre-established frequency which, if the person entering the washroom is an employee or other person equipped with subassembly 10, is picked up by receiver 20 and detected by frequency detector 22. Upon activation by frequency detector 22, frequency generator 24 produces the pre-established frequency assigned to the particular individual and emits that frequency over transmitter 28.

An identification frequency emitted by transmitter 28 is picked up by a receiver 42 in subassembly 12 and relayed from the receiver to a frequency analyzer 44. Analyzer 44 converts an incoming analog signal into a digital signal indicative of the frequency of the incoming analog signal and accordingly indicative of the individual employee entering the washroom. Analyzer 44 has an output lead working into control unit 16 whereby that unit, operating in conjunction with a memory 46, is able to identify an individual who is entering the washroom facility. The same components of subassemblies 10 and 12 also function to inform control unit 16 of the identity of an individual who is leaving the washroom facility.

Subassembly 14 includes a transmitter 50 which, like transmitter 36, wirelessly emits an activation signal of a predetermined frequency for activating any subassembly 10 which comes within the effective range of transmitter 50. Transmitter 50 is positioned proximately to a cleaning station inside the washroom facility. Such a cleaning station takes the form, for example, of a soap dispensing unit or a blow dryer. The activation signal or frequency emitted by transmitter 50 is picked up by receiver 20 and detected by frequency detector 22, which transmits an enabling signal to frequency generator 24 to induce the wireless emission of a signal via transmitter 28. The emitted signal is picked up by a receiver 52 in subassembly 14 and relayed thereby to a frequency analyzer 54. In response to a respective incoming frequency, frequency analyzer 54 transmits to control unit 16 an output signal indicative of the identity of an employee or other monitored person at a cleaning station in the washroom.

Subassembly 14 optionally includes a proximity detector 48, which may take the form of an infrared radiation detector or an ultrasonic movement detector. Proximity detector 48 is disposed at a hands cleaning device such as a soap dispenser (not shown), a blower (not shown) or a water valve (not shown) in the washroom facility for determining whether a person is in the neighborhood of the cleaning device. Proximity detector 48 is coupled at an output to transmitter 50 for enabling that unit to emit the wireless activation signal upon the detection of a human being at the monitored hands cleaning device.

In accordance with a preferred embodiment of the invention, transmitter 50 is activated only upon receiving an enabling signal from a soap dispensing detector 60. Soap detector 60 is disposed at a soap dispenser (not shown) for transmitting an enabling signal to transmitter 50 in the event that the soap dispenser is operated to eject an aliquot of liquid or powdered soap. Soap dispensing detector 60 may be provided with a manually activated switch (not illustrated) and with a proximity detector of its own (e.g., detector 48) which together function to determine that a person has operated the soap dispenser to dispense an aliquot of liquid or powdered soap onto the person's hand or hands. Upon making such a determination, soap dispensing detector transmits an enabling signal to transmitter 50.

In another alternative design, a switching circuit 56 receives input signals from soap dispensing detector 60, as well as from a blower activation detector 62 and a water valve monitor 64, respectively. Blower activation detector 62 and water valve monitor 64 are operatively connected to a hot air blower (not shown) and a water valve (not illustrated), respectively, for transmitting respective enabling signals to switching circuit 56 in the event that the blower is being operated to dry an individual's hands or that the water valve is opened. Switching circuit 56 is operated to select among soap detector 60, blower activation detector 62 and water valve monitor 64, i.e., to alternatively connect soap detector 60, blower activation detector 62 and water valve monitor 64 to transmitter 50. Switching circuit 56 may optionally be provided with logic and timing circuitry for forwarding an enabling signal to transmitter 50 only upon receiving signals from soap detector 60, blower activation detector 62 and water valve monitor 64 in a predetermined sequence within a predetermined period of time.

Proximity detector 48 may be operatively connected to soap detector 60, blower activation detector 62 and water valve monitor 64 or to switching circuit 56 for activating those components in response to the proximity of a human being.

Upon receiving from frequency analyzer 54 a signal indicating that a pre-assigned individual has initiated or completed a hands cleaning procedure, control unit 16 changes a bit value in memory 46, as described hereinafter with reference to FIG. 2.

Control unit 16 is optionally connected at an output to a transmitter 68 for emitting a preselected frequency or waveform in the event that one of the "tagged" employees exits the washroom facility without having washed his hands. That waveform is picked up by receiver 20 carried on the identification tag of the employee and detected by frequency detector 30. Upon detection of the waveform emitted by transmitter 68, detector 30 energizes electro-optic transducer 32 or electro-acoustic transducer 34, thereby alerting the employee and other people in the employee vicinity as to a possibly unsanitary condition of the employee's hands.

Control unit 16 is also connected to a computer 70 which may serve in the performance of daily management activities. Control unit 16 sends to computer 70 signals regarding hands cleaning in the washroom facility. Computer 70 displays results of hygiene monitoring on a monitor 72.

Figure 2:
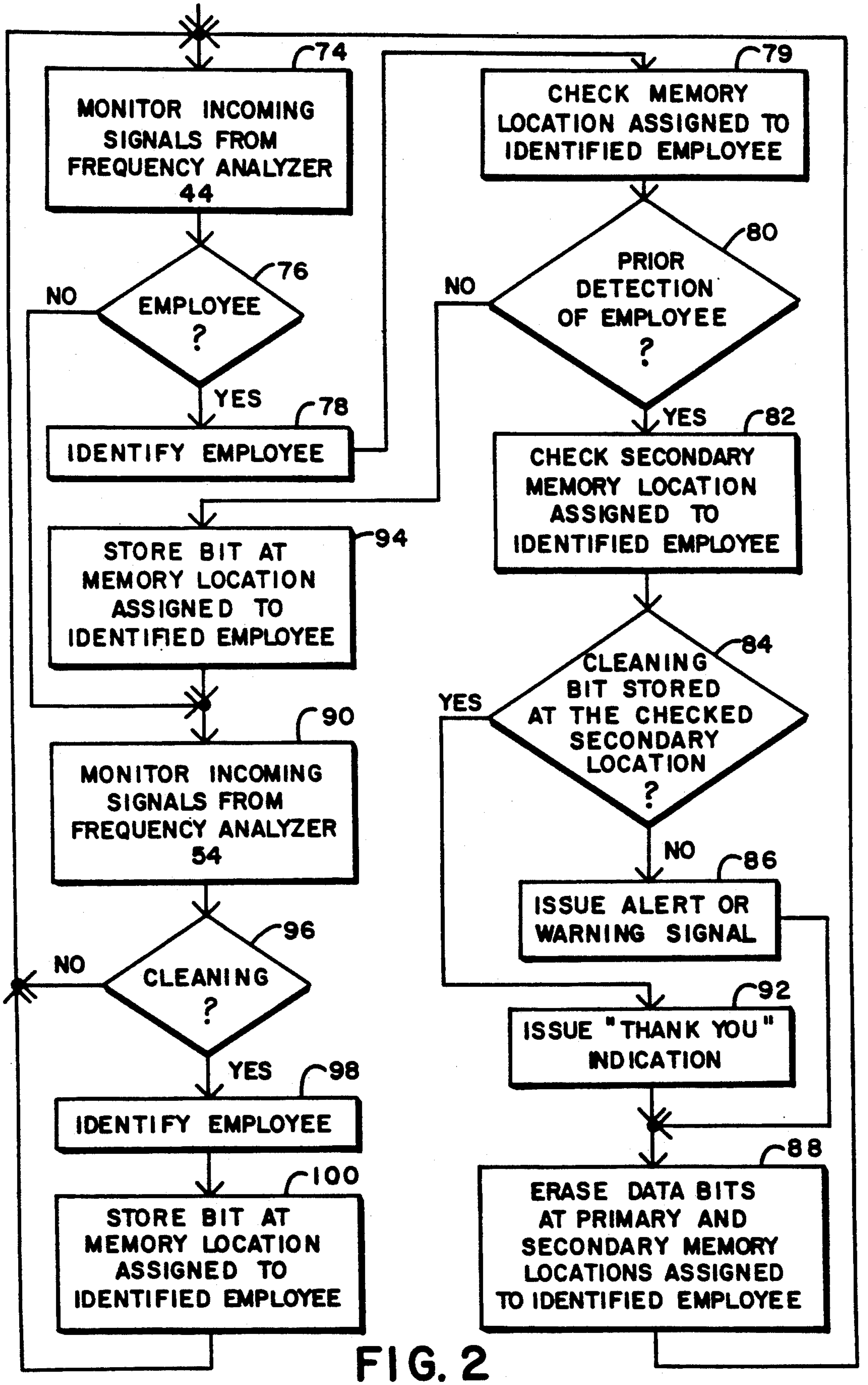
FIG. 2 is a flow chart diagram showing successive steps in the operation of a control unit shown in FIG. 1.

As shown in FIG. 2, an operational sequence of control unit 16 includes first step 74 in which the control unit monitors or scans signals from frequency analyzer 44 to determine the presence of a signal indicating that a monitored individual ("tagged" employee) is entering or leaving the washroom facility. Upon determining at an inquiry 76 that a signal has arrived from frequency analyzer 44, control unit 16 identifies the employee in a step 78 and then checks in a step 79 a location in memory 46 assigned to that employee. If there is a bit at the assigned memory location signifying that the employee has been previously detected, i.e., has recently entered the washroom facility, as determined by control unit 16 at a decision junction 80, the control unit then checks in a step 82 a secondary memory location assigned to the same individual. If control unit 16 determines at another decision junction 84 that the secondary memory location fails to contain a bit signifying that the identified employee has cleaned his hands, the control unit generates an alert or warning signal in a step 86. The alert or warning signal is transmitted to electro-acoustic transducer 18 for issuing a speech-synthesized or recorded message such as "You have apparently forgotten to clean your hands. Please return to the washroom at once." Alternatively, or additionally, the warning or alert signal activates transmitter 68 to emit a waveform picked up by receiver 20 and detected by frequency detector 30 which thereupon energizes electro-optic transducer 32 or electroacoustic transducer 34, as described hereinabove. As also discussed hereinabove, control unit 16 may additionally send a signal to computer 70 indicating that the employee left the washroom facility without washing his hands and did not return to the washroom within a predetermined period of time, essentially immediately.

After issuance of the alert or warning signal in step 86, control unit 16 erases the data bits at the primary and secondary locations in memory 46 assigned to the identified individual (step 88). Then control unit 16 returns to execute step 74.

If at decision junction 84 control unit 16 determines that there is a cleaning bit at the secondary location assigned to the identified individual, indicating that the individual who is now leaving the washroom facility washed or cleaned his hands while in the washroom facility, control unit 16 may issue a voice-synthesized or recorded message in a step 92 to extend appreciation to the employee for his care in remembering to clean his hands. The "thank you" message may be generated via electroacoustic transducer 18. After issuing the message, control unit 16 executes step 88 to erase the data bits at the primary and secondary locations in memory 46 assigned to the identified individual.

If at decision junction 80 control unit 16 determines that there is no prior detection of the identified individual, i.e., that the individual is entering the washroom facility, the control unit stores a bit at the primary memory location assigned to the identified individual (step 94). That bit describes the respective individual as being inside the washroom facility.

After storing a bit in step 94, control unit 16 executes step 90 to monitor signals from frequency analyzer 54 to determine whether any employees remaining in the washroom facility are washing their hands. This step is also executed by control unit 16 upon a determination by the control unit at inquiry 76 that no employee is either entering or leaving the washroom.

If control unit 16 discovers at an inquiry 96 that an employee is cleaning his hands, the control unit determines in a step 98 the identity of the employee and then stores in a step 100 a bit in the secondary memory location assigned to that employee. At that juncture, control unit 16 returns to initial step 74 to again scan the signals from frequency analyzer 44.

Although the invention has been described in terms of particular embodiments and applications, one of ordinary skill in the art, in light of this teaching, can generate additional embodiments and modifications without departing from the spirit of or exceeding the scope of the claimed invention. For example, the scanning of employees in a washroom facility may be extended to include scanning of non-employed persons such as customers at a restaurant and visitors and patients in a hospital. Of course, if such people are presented with identification tags as described herein, the hygiene enhancing system may function in essentially the same way as discussed above. However, the principles of the invention may also be used to monitor individuals who are identified and tracked continuously by computer. Thus, movements of an individual who has entered a washroom type facility are monitored to determine when that individual is leaving the washroom facility and whether that individual has washed his or her hands prior to exit. The system may use any of numerous indicators to keep track of different people in the facility.

Pursuant to the above, it is to be understood that the drawings and descriptions herein are preferred by way of example to facilitate comprehension of the invention and should not be construed to limit the scope thereof.

What is claimed is:

1. An apparatus for enhancing hygiene, comprising:
   - first monitoring means for automatically and simultaneously monitoring each of a plurality of preselected individuals upon entry of same into a washroom, to automatically determine whether each of said individuals has executed a predetermined action for cleaning his hands;
   - second monitoring means for automatically detecting that any one of said individuals has exited said washroom; and
   - alert indicator means operatively connected to said first monitoring means and said second monitoring means for automatically generating an alert signal cognizable by a human being, upon detecting that said one of said individuals has exited said washroom and has not executed said predetermined action while in said washroom.

2. The apparatus recited in claim 1 wherein said first monitoring means and said second monitoring means include means for identifying said individual and distinguishing said individual from other persons who enter said washroom.

3. The apparatus recited in claim 2 wherein said means for identifying includes means carried on the person of said individual for emitting a wireless signal identifying said individual, said means for identifying further including detector means for detecting said wireless signal.

4. An apparatus for enhancing hygiene, comprising:

sensor means for generating a first signal upon automatically sensing that an individual has entered a washroom and for generating a second signal upon automatically sensing that said individual has exited said washroom;

monitoring means for automatically monitoring said individual upon entry of same into said washroom, to automatically determine whether said individual has executed a predetermined action for cleaning his hands, said monitoring means including means for generating a third signal upon detecting that said individual has executed said predetermined action;

alert means for generating an alert signal cognizable by a human being;

control means operatively connected to said sensor means, said monitoring means, and said alert means for activating said alert means to issue said alert signal upon reception of said first signal and said second signal by said control means and failure of said control means to receive said third signal prior to receiving said second signal; and transmitter means carried on the person of said individual for emitting a wireless signal identifying said individual, said sensor means including detector means for detecting said wireless signal.

5. The apparatus recited in claim 4, further comprising receiver means carried on the person of said individual and operatively connected to said transmitter means for activating said transmitter means upon receiving a wireless activation signal.

6. The apparatus recited in claim 5 wherein said sensor means further includes generator means for emitting said activation signal, said sensor means also including additional detector means for detecting any person entering said washroom, said additional detector means being operatively coupled to said generator means for enabling same to emit said activation signal upon a detection of a person by said additional detector means.

7. The apparatus recited in claim 6 wherein said additional detector means includes an infrared radiation detector.

8. The apparatus recited in claim 6 wherein said additional detector means includes an ultrasonic pressure wave detector.

9. The apparatus recited in claim 4 wherein said transmitter means is disposed on a name tag.

10. The apparatus recited in claim 4 wherein said monitoring means includes means for detecting deposition of a cleaning agent on hands of said individual.

11. The apparatus recited in claim 4 wherein said alert means includes means for generating an audible alert signal.

12. The apparatus recited in claim 4 wherein said alert means includes means for generating a visual alert signal.

13. The apparatus recited in claim 12 wherein said means for generating a visual alert signal includes a light emitting element and means for temporarily attaching said element to the person of said individual.

14. A method for enhancing hygiene comprising the steps of:

automatically identifying each of a plurality of preselected individuals upon entry of same into a washroom;

monitoring each of said individuals upon entry of same into said washroom, to determine whether each of said individuals has executed a predetermined action for cleaning his hands;

detecting that any one of said individuals has exited said washroom; and generating an alert signal cognizable by a human being, upon detecting that said one of said individuals has exited said washroom and has not executed said predetermined action while in said washroom.

15. The method recited in claim 14, further comprising the steps of:

sensing that said one of said individuals has entered said washroom;

generating a first signal upon detecting that said one of said individuals has entered said washroom;

generating a second signal upon detecting that said one of said individuals has executed said predetermined action; and generating a third signal upon detecting that said one of said individuals has exited said washroom, said alert signal being generated upon generation of said first signal and said third signal in an absence of generation of said second signal.

16. The method recited in claim 15 wherein said step of identifying includes the step of operating a transmitter, carried on the person of said individual, to emit a wireless signal identifying said individual, said step of sensing including the step of detecting said wireless signal.

17. The method recited in claim 14, further comprising the steps of emitting a wireless activation signal and activating said transmitter in response to said wireless activation signal.

18. The method recited in claim 17 wherein said step of sensing further includes the step of detecting any person entering said washroom, said activation signal being emitted upon detecting that a person has entered said washroom.

19. The method recited in claim 14 wherein said alert signal is an audible alert signal.

20. The method recited in claim 14 wherein said alert signal is a visual alert signal.

21. An apparatus for enhancing hygiene, comprising:

identification means for identifying each of a plurality of preselected individuals and distinguishing said individuals from one another;

first monitoring means operatively connected to said identification means for automatically monitoring any one of said individuals upon entry of said one of said individuals into a washroom, to automatically determine whether said one of said individuals has executed a predetermined action for cleaning his hands;

second monitoring means operatively connected to said identification means for automatically detecting that said one of said individuals has exited said washroom; and alert indicator means operatively connected to said first monitoring means and said second monitoring means for automatically generating an alert signal cognizable by a human being, upon detecting that said one of said individuals has exited said washroom and has not executed said predetermined action while in said washroom.

22. The apparatus recited in claim 21 wherein said identification means includes means carried on the persons of each of said individuals for emitting a wireless signal identifying respective ones of said individuals, said identification means further including detector means for detecting said wireless signal.

23. An apparatus for enhancing hygiene, comprising:

first monitoring means for automatically and simultaneously monitoring each of a plurality of individuals upon entry of same into a washroom, to automatically determine whether each of said individuals has executed a predetermined action for cleaning his hands;

second monitoring means for automatically detecting whether any one of said individuals has exited said washroom; and alert indicator means operatively connected to said first monitoring means and said second monitoring means for automatically generating an alert signal cognizable by a human being; upon detecting that said one of said individuals has exited said washroom and has not executed said predetermined action while in said washroom.

24. A method for enhancing hygiene, comprising the steps of:

automatically and simultaneously monitoring each of a plurality of individuals upon entry of same into a washroom, to determine whether each of said individuals has executed a predetermined action for cleaning his hands;

detecting whether any one of said individuals has exited said washroom; and generating an alert signal cognizable by a human being, upon detecting that said one of said individuals has exited said washroom and has not executed said predetermined action while in said washroom.

25. The method recited in claim 24, further comprising the steps of:

sensing that said one of said individuals has entered said washroom;

generating a first signal upon detecting that said one of said individuals has entered said washroom;

generating a second signal upon detecting that said one of said individuals has executed said predetermined action; and generating a third signal upon detecting that said one of said individuals has exited said washroom, said alert signal being generated upon generation of said first signal and said third signal in an absence of generation of said second signal.

26. The method recited in claim 25, further comprising the step of operating a plurality of transmitters carried on the persons of said individuals, to emit wireless signals identifying said individuals, said step of sensing including the step of detecting one of said wireless signals.

* * * * *